No. 786,091. PATENTED MAR. 28, 1905.
H. BOLLWEBER.
FRUIT PRESS.
APPLICATION FILED OCT. 12, 1904.
2 SHEETS—SHEET 1.
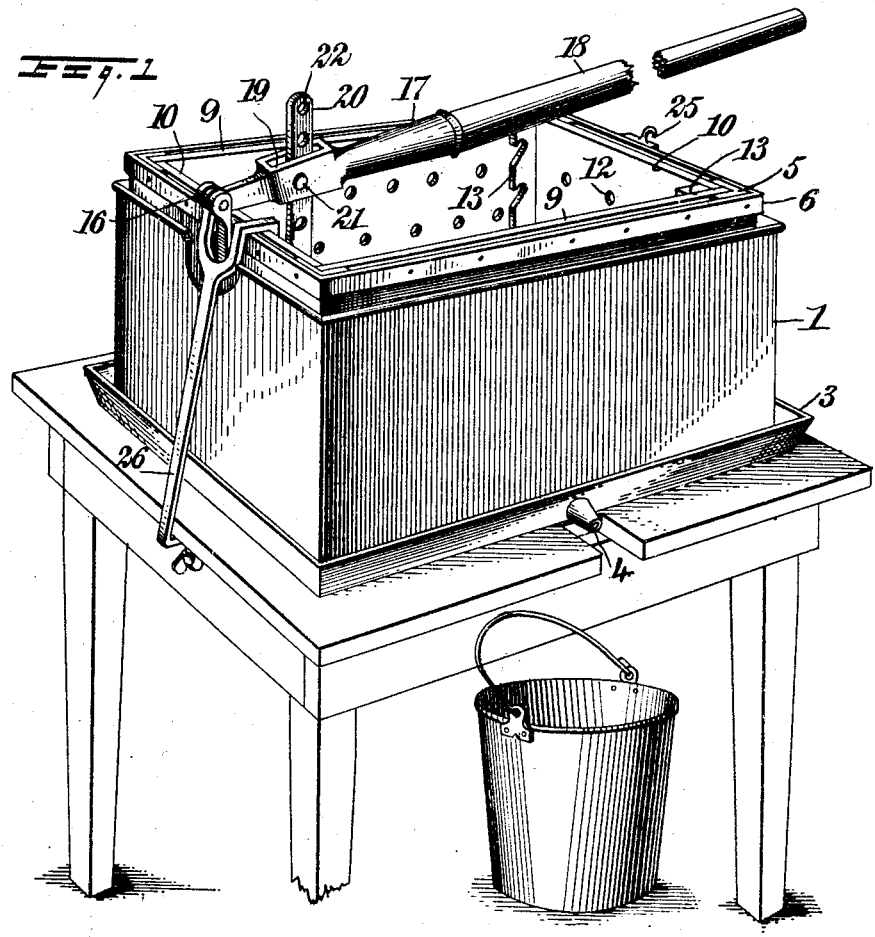
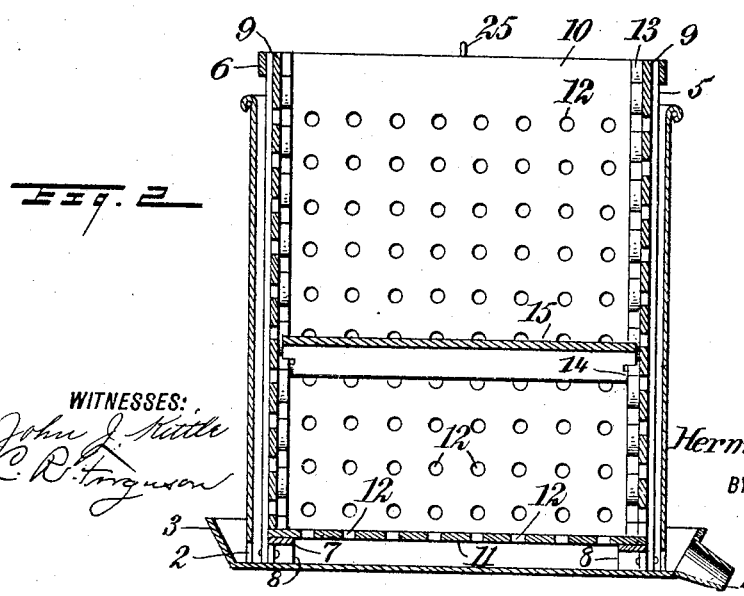
WITNESSES:
John J. Kittle
C. R. Ferguson
INVENTOR
Herman Bollweber
BY
ATTORNEYS

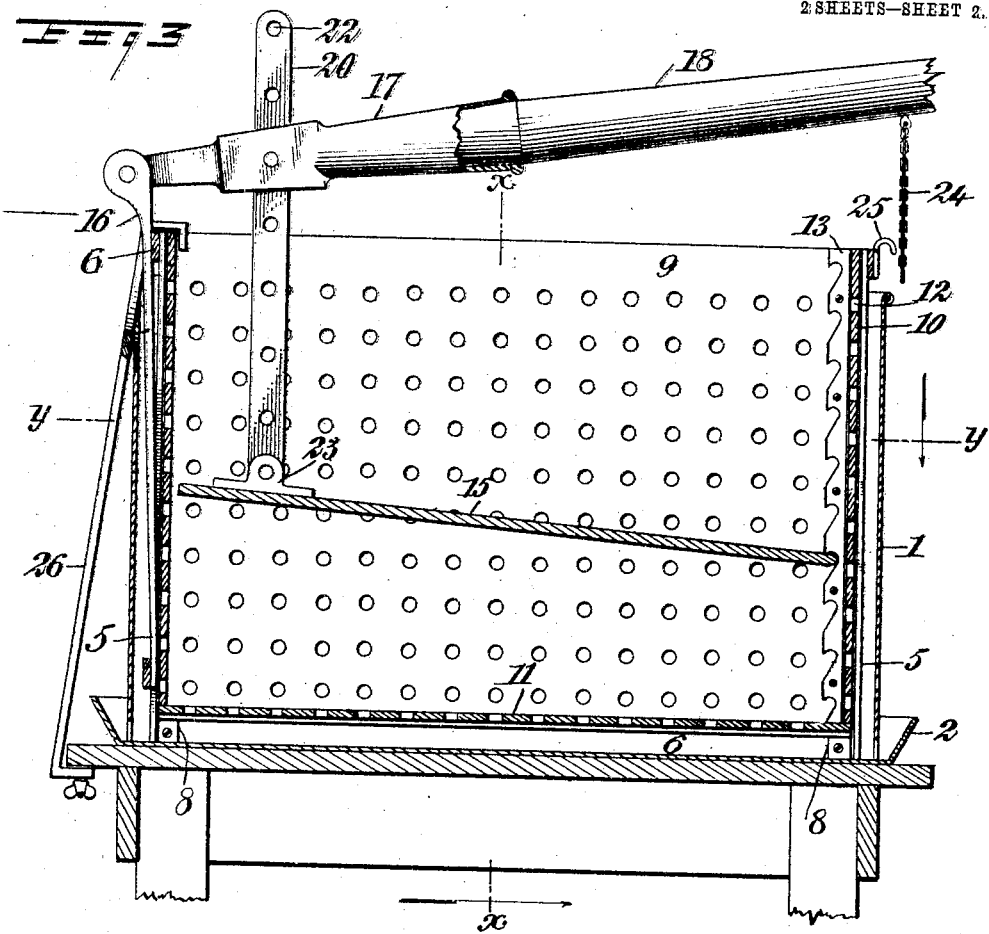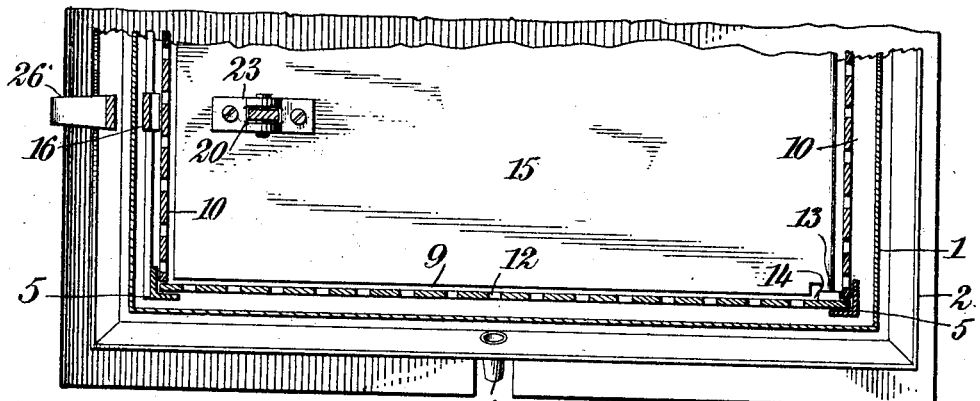

No. 786,091.

Patented March 28, 1905.

UNITED STATES PATENT OFFICE.

HERMAN BOLLWEBER, OF SPOKANE, WASHINGTON.

FRUIT-PRESS.

SPECIFICATION forming part of Letters Patent No. 786,091, dated March 28, 1905.

Application filed October 12, 1904. Serial No. 228,231.

*To all whom it may concern:*

Be it known that I, HERMAN BOLLWEBER, a citizen of the United States, and a resident of Spokane, in the county of Spokane and State of Washington, have invented a new and Improved Fruit-Press, of which the following is a full, clear, and exact description.

This invention relates to improvements in machines for pressing juice from fruit or fruit-pulp, the object being to provide a press of simple and inexpensive construction and by means of which the juice may be rapidly and uniformly pressed out.

I will describe a fruit-press embodying my invention and then point out the novel features in the appended claims.

Reference is to be had to the accompanying drawings, forming a part of this specification, in which similar characters of reference indicate corresponding parts in all the figures.

Figure 1 is a perspective view of a fruit-press embodying my invention. Fig. 2 is a section on the line $xx$ of Fig. 3. Fig. 3 is a longitudinal vertical section, and Fig. 4 is a section on the line $yy$ of Fig. 3.

The press comprises an outer casing 1, open at the top and bottom and provided with openings 2 at the bottom for the discharge of juice into a tray 3, in which the said casing is placed, this tray being provided with a funnel-shaped spout 4, through which the liquid may pass into a receptacle placed to receive it.

Removably placed in the casing 1 is a fruit-receptacle consisting of angle-iron corner-posts 5, attached at the top to a frame 6 and at the lower portion to angle-irons 7, and this frame so formed is supported above the bottom of the tray by means of short legs 8. Removably placed in the frame are side plates 9, end plates 10, and a bottom plate 11. Each of these plates is provided with perforations 12. It will be noted that the fruit-receptacle is spaced somewhat from the inner surface of the casing 1, thus permitting juice pressed through the openings of the side and end plates to pass down into the tray. Attached to one end of the opposite side plates 9 are racks 13, the upper walls of the notches in which are slightly hook-shaped or inclined upward and outward. Opposite notches are designed to receive trunnions 14, formed on the end of the presser-plate 15.

Attached to the top and bottom members of the receptacle-frame is a post 16, to which an operating-lever is fulcrumed. As here shown, this lever consists of a metal socket member 17 and a wooden extension 18. The socket member 17 is provided with a vertical opening 19, through which a presser-bar 20 is adjustable and held as adjusted by means of a pin 21 passed through openings in the side walls of the opening 19 and through any one of a series of perforations 22 in the presser-bar. The lower end of the presser-bar is pivoted to a block 23, attached to the upper side of the presser-plate near the free end. By the manner of mounting the presser-plate it is obvious that it acts with a considerable leverage, and by this, in connection with the operating-lever, the pressure is compound. A chain 24, attached to the operating-lever and designed for engagement with a hook 25 on the receptacle-frame, serves to hold the press downward under pressure.

When the apparatus is in operation, it may be held firmly in connection with a table by means of a clamp consisting of a bar 26, having a hook upper end for engaging over the receptacle-frame and having a portion for extending underneath the table-top, which is fastened by a set-screw, as clearly illustrated in Fig. 3.

By making the several perforated plates removable they may be taken out and readily washed or otherwise cleaned.

Having thus described my invention, I claim as new and desire to secure by Letters Patent—

1. A fruit-press comprising a casing, a perforated fruit-receptacle in the casing, vertical racks in the receptacle, a presser-plate adapted for engagement with said racks, and a lever having connection with said plate.

2. A fruit-press comprising a casing, a perforated receptacle removably arranged in the casing, racks secured to the inner side of said receptacle, a presser-plate having trunnions at one end for engaging with said racks, an operating-lever, and an adjustable connection between said lever and the presser-plate.

3. A fruit-press comprising a casing open at the top and bottom, a tray in which the casing is placed, said tray having an outlet, a perforated fruit-receptacle arranged in the casing, racks secured in said receptacle at one end, a presser-plate having trunnions at one end for engaging with said racks, a bar attached to the receptacle, a lever fulcrumed on said bar, a link having pivotal connection with the presser-plate near its free end, and an adjustable connection between said link and the lever.

4. A fruit-press comprising a casing open at the top and bottom, a tray in which the casing is arranged, a fruit-receptacle consisting of angle-iron corner-posts, a metal frame connecting the top ends of the posts, perforated side, end and bottom plates removably placed in the frame, racks secured to the inner sides of the side plates, a presser-plate having trunnions for engaging with said racks, an operating-lever, an adjustable connection between said lever and presser-plate, and means for locking the operating-lever in downward position.

In testimony whereof I have signed my name to this specification in the presence of two subscribing witnesses.

HERMAN BOLLWEBER.

Witnesses:
PHIL. T. BECHER,
C. L. MORSE.